United States Patent
Bates et al.

(10) Patent No.: US 6,931,631 B2
(45) Date of Patent: Aug. 16, 2005

(54) LOW IMPACT BREAKPOINT FOR MULTI-USER DEBUGGING

(75) Inventors: Cary Lee Bates, Rochester, MO (US); William Jon Schmidt, Rochester, MO (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 09/893,385

(22) Filed: Jun. 27, 2001

(65) Prior Publication Data

US 2003/0005415 A1 Jan. 2, 2003

(51) Int. Cl.⁷ .............................................. G06F 9/44
(52) U.S. Cl. .................... 717/129; 717/130; 717/131
(58) Field of Search ................................ 717/124–133, 717/154–161; 714/32–39

(56) References Cited

U.S. PATENT DOCUMENTS 5,548,717 A * 8/1996 Wooldridge et al. ........ 717/124
5,835,699 A * 11/1998 Kimura ....................... 714/34

OTHER PUBLICATIONS

Ramsey, "Correctness of Trap–Based Breakpoint Implementations".*
Hanson et al., "A Machine–Independent Debugger", Dept. of Computer Science, Princeton University, Software—Practice And Experience, vol., 26(11), pp. 1277–1299, Nov. 1996.*

* cited by examiner

Primary Examiner—Ted T. Vo
(74) Attorney, Agent, or Firm—Moser, Patterson & Sheridan, LLP

(57) ABSTRACT

Method and system for a software debugger tool. Breakpoints are submitted, as breakpoint data, by a user. A breakpoint manager stores the breakpoint data and inserts the breakpoints into the software program code. The breakpoint manager gains control of the program when a breakpoint is processed associated with a particular job. After the breakpoint manager completes an interrupt routine to process the breakpoint, using instructions stored in the breakpoint data, the method removes breakpoints associated with the particular job. When control is to be returned to the program, only those breakpoints that are found to be useful are set.

28 Claims, 12 Drawing Sheets

LOW IMPACT BREAKPOINT FOR MULTI-USER DEBUGGING

BACKGROUND OF THE INVENTION

1. Field of the Invention

This invention relates to software programming development and more particularly to a software debugging system for managing breakpoints.

2. Description of the Related Art

A programmer develops a software program by producing and entering source code into files using a text editor program. The computer then creates an executable program by translating the source code listing into machine code. The machine code is the rudimentary language understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software.

A conventional debugging system comprises a combination of computer hardware and debugger software that executes a user's program in a controlled manner. Debugging aids a user in identifying and correcting mistakes in an authored program by allowing the program to be executed in small segments. This approach is enabled primarily by two operations: step functions and breakpoints.

A "step" function permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, conventional debuggers utilize a breakpoint operation, which permits a computer programmer to identify, with a "breakpoint", a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis.

Some conventional debuggers support unconditional breakpoints where the execution of the program is always halted upon reaching the breakpoint. Other debuggers support conditional breakpoints that halt the execution of a program only when a predetermined value is obtained when the breakpoint is encountered.

Typically, step operations and breakpoints are used together to simplify the debugging process. Specifically, a common debugging operation is to set a breakpoint at the beginning of a desired set of instructions to be analyzed, and then begin executing the program. Once the breakpoint is reached, the program is halted, and the programmer then steps through the desired set of instructions line by line using the step operation. Consequently, a programmer is able to quickly isolate and analyze a particular set of instructions without having to step through irrelevant portions of a computer program.

One significant drawback to conventional breakpoint debugging methods is that some instructions in a computer program are executed often which may result in needless halting of the program. This problem is more pronounced in highly modular languages, such as object-oriented programming (OOP) languages, where a single general-purpose portion of a computer program might be executed in many different situations.

With an OOP language, a program is constructed from a number of "objects," each of which includes data and/or one or more sets of instructions (often referred to as "routines" or "methods") that define specific operations that can be performed on the data. A large number of objects may be used to build a computer program, with each object interacting with other objects in the computer program to perform desired operations.

Some general purpose objects in a computer program may support basic operations, e.g., displaying information to a user, printing information on a printer, storing or retrieving information from a database, etc. These types of objects, in particular, may have routines that are called by many different objects. Thus, placing a conventional breakpoint in a routine of such an object may result in hundreds of unwanted stoppages prior to occurrence of a desired stoppage.

Multi-user computer systems, such as mainframe computers, minicomputers, and networked computers, allow a plurality of processes, submitted by various users, to execute. These processes utilize some of the same processing hardware, program code or software objects, and data. This utilization of the same objects is especially true for a single level store system, such as an IBM eServer iSeries 400 computer. To achieve efficiencies, a single level store system will load a single copy of program code or instructions into memory, allowing multiple processes to utilize these instructions. By contrast, some other systems generally allow each process to access program code, allocating independent resources for loading this code into memory. Consequently, inserting a breakpoint into the instructions on a single level store system can mean that more than one process hits the breakpoint, burdening the processor.

The problem of unnecessary program stoppage is further compounded in multi-user systems because more than one user may be executing the same program at the same time. Other users on the system encounter delays because the system must process additional steps required when needlessly encountering a breakpoint. In order to accommodate the multi-user environment, it is generally known to implement a breakpoint as an interrupt in the computer program. Execution of the computer code thus has a software jump or a hardware interrupt to a breakpoint handling code which differentiates between users. The breakpoint handling code determines whether execution should be halted by seeing if the process setting the breakpoint also hits the breakpoint and whether any conditions are satisfied. Execution continues at the point of the breakpoint for processes not associated with the breakpoint by masking the breakpoint.

Regardless of the reason, when processes needlessly encounter breakpoints, overall system degradation can occur. Furthermore, when a computer system is executing slowly, due to system degradation, it is often difficult to debug timing-related faults.

Therefore, there is a need for a debugging system and method for processing breakpoints that does not unduly degrade the performance of a computer system.

SUMMARY OF THE INVENTION

The present invention generally provides an apparatus, program product, and a method for debugging computer programs that addresses the problems associated with the management of breakpoints, particularly in multi-user environments.

In one embodiment a method of debugging a program in a computer system comprises automatically removing at least a portion of all breakpoints associated with a particular job from the program when a debugger gets control of the program for the particular job. In another embodiment a computer readable medium contains a program which when executed performs the foregoing method.

In another embodiment, a method of debugging a program in a computer system comprises, upon a debugger getting control of the program for a particular job, determining whether at least one useful breakpoint exists in the program for the particular job and if so, removing from the program all breakpoints associated with the particular job except the at least one useful breakpoint. Prior to returning control to the program from the debugger, it is determined whether at least one of the removed breakpoints is useful; and if so, the at least one of the removed breakpoints is reestablished.

In still another embodiment a method of debugging a program in a multi-user computer system comprises, during a time when execution of the program is halted, removing all breakpoints associated with a particular job from the program; executing a task to identify each useful breakpoint located in the program, wherein a useful breakpoint is one which may be encountered upon resuming execution of the program; and if the task is completed before execution of the program is resumed, inserting each useful breakpoint into its original location in the program. In another embodiment a computer readable medium contains a program which when executed performs the foregoing method.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
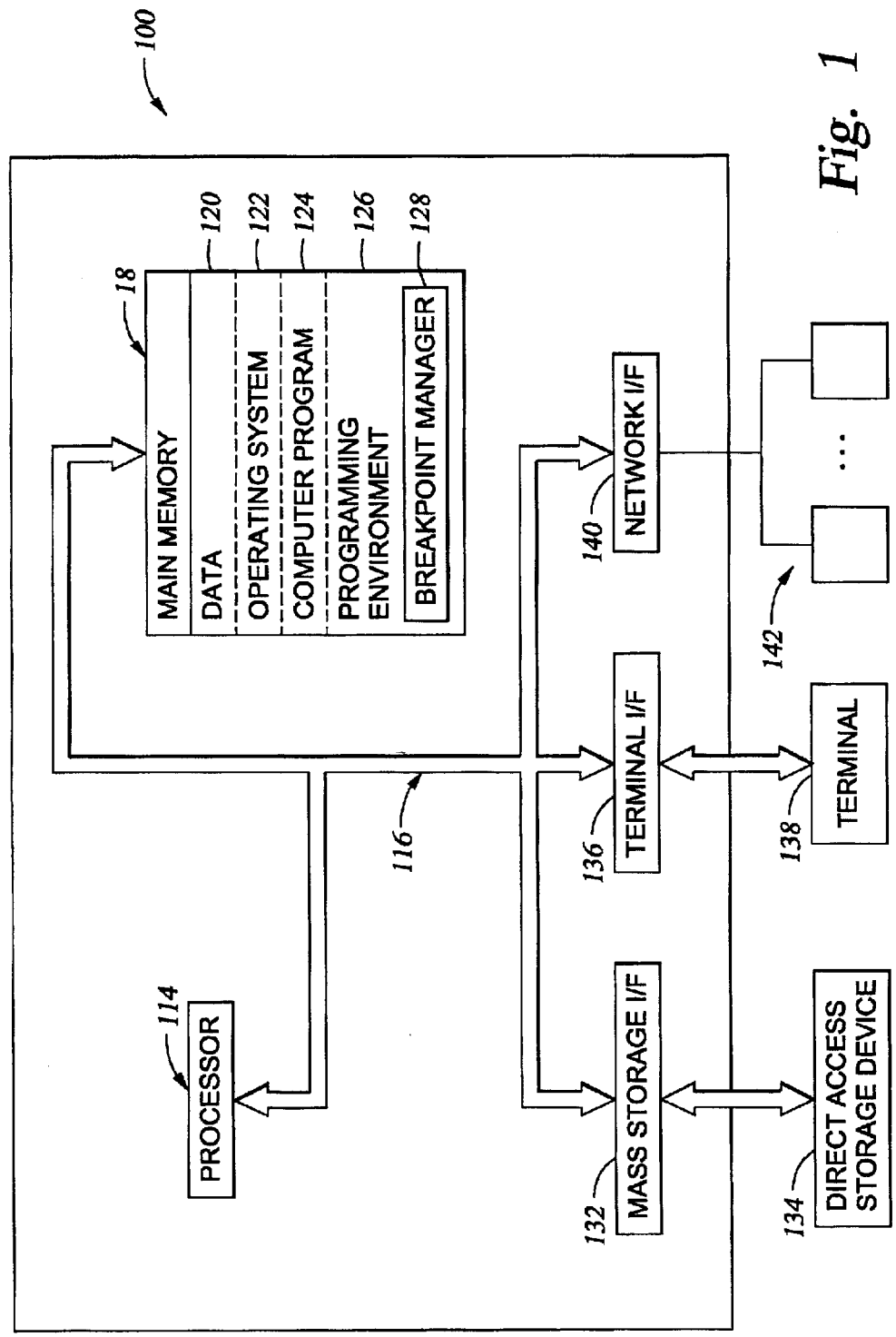
FIG. 1 is a block diagram of a computer system consistent with the invention.

The present invention provides a system and method for breakpoint management in a software debugger program. More particularly, embodiments are provided that remove breakpoints that are currently not useful to a user and restore some or all of the removed breakpoints when they again become useful, thereby alleviating system degradation from excessive breakpoint interruptions.

In one embodiment, a breakpoint is "useful" if the program being debugged is in a state where it may encounter the breakpoint. If a breakpoint cannot be encountered due to the current state of the program then the breakpoint is not useful. In general, a "state" is defined by whether the program or the debugger has control. The debugger gains control of the program when a breakpoint is hit or another debugger operation such as a "step" operation completes and causes program execution to be halted. The program has control during execution of the program. For the purposes of this application, the aspects of a program's state which are relevant are the state of the program's execution and, if not currently being executed, the position at which the program is halted referred to as the stopped position). In addition, execution of the program includes execution of any thread or number of threads.

In one embodiment, all breakpoints are removed from a program when a debugger has control. Immediately before the debugger relinquishes control and allows the execution to resume, all useful breakpoints are reestablished. In this case, "all useful breakpoints" may include all breakpoints or some portion of all breakpoints.

In another embodiment, a breakpoint analysis task identifies useful breakpoints while a debugger has control relative to a future state when the program again has control. In this case, a breakpoint is not useful if it cannot be encountered during subsequent execution from the current stopped position. This can occur if the breakpoint in question is set in a part of the program being debugged that will not be executed again, or if the execution path to the breakpoint is blocked by another breakpoint. In this regard, the determination of whether a break point may be encountered can be performed for a particular thread or threads. For example, if a user resumes execution of a first thread but holds the execution of a second thread, then all breakpoints which may be encountered by the first thread are considered useful while all breakpoints specific to the second thread are considered not useful.

In another embodiment, each breakpoint is cross-referenced to a specific process or job. When a debugger gains control of the process, and program execution is halted, the debugger removes all breakpoints cross-referenced to the current process or job. While the program is under the debugger's control, a set of useful breakpoints based on the current stopped position is determined. These useful breakpoints are reestablished when the debugger gives up control of the program.

In one embodiment, a Control Flow Graph (or CFG) is used to advantage to determine useful breakpoints. A CFG is a data structure known in the art representing the structure of the program being debugged. The CFG is traversed and all breakpoints that may possibly be encountered from the current stopped position without going past an existing breakpoint are noted. These breakpoints are the current useful breakpoints, and will be reestablished just before the debugger relinquishes control and allows program execution to continue.

Although not required, one embodiment is described in the general context of computer-executable instructions, such as program modules, being executed by a computer, such as a personal computer, for example. Generally, program modules include routines, programs, objects, components, data structures, etc. that perform particular tasks or implement particular abstract data types. In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

The program modules that define the functions of the present embodiments may be placed on a signal-bearing medium. The signal bearing media, include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

FIG. 1 shows one embodiment of a computer 100. For purposes of the invention, computer system 100 may represent practically any type of computer, computer system or other programmable electronic device, including a client computer, a server computer, a portable computer, an embedded controller, etc. The computer system 100 may be a stand alone device or networked into a larger system.

The computer 100 is shown for a multi-user-programming environment that includes at least one processor 114 to obtain instructions and data via bus 116 from main memory 118. Illustratively, the processor 114 is any processor configured to support the methods described herein. The main memory 118 includes host data 120, an operating system 122, a computer program 124, a programming environment 126, and a breakpoint manager 128. As an illustration, the main memory 118 could be one or a combination of memory devices, including random access memory (RAM), non-volatile or backup memory such as programmable or flash memory or read-only memory (ROM). The main memory 118 may be physically located in another part of the computer 100. The programming environment 126 provides a means to debug the computer program 124 by providing tools for locating, analyzing and correcting faults. One such tool for use in debugging a program is the breakpoint manager 128.

Illustratively, the computer also includes a mass storage interface 132 coupled to a direct access storage device 134, a terminal interface 136 coupled to a terminal 138, and a network interface 140 coupled to a plurality of networked devices 142. As an illustration, the terminal 138 and networked devices 142 are desktop or PC-based computers, workstations, network terminals, or other networked computer systems.

Figure 2:
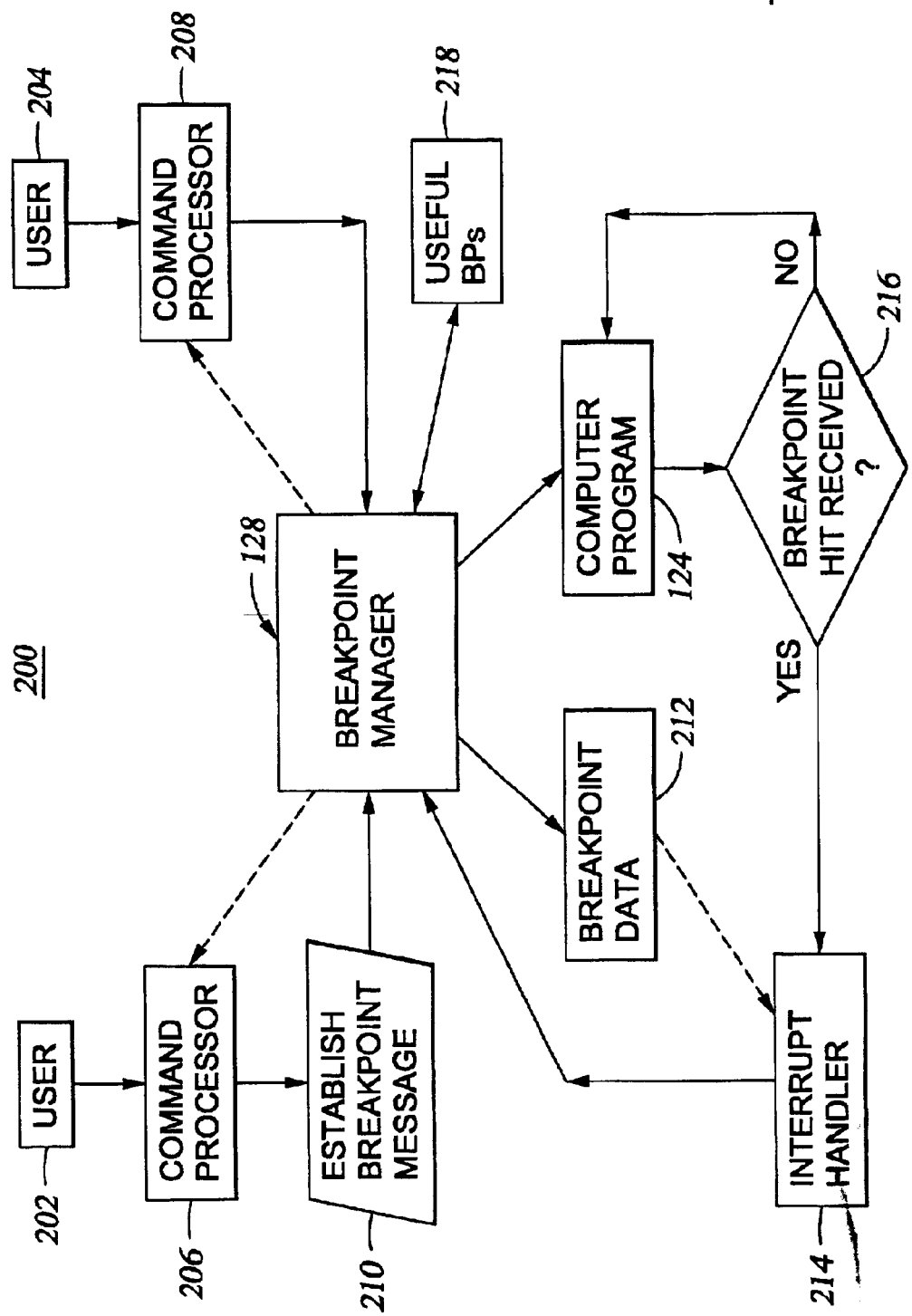
FIG. 2 is a block diagram of an exemplary software environment for the computer system of FIG. 1.

FIG. 2 illustrates a multi-user environment for the breakpoint manager 128 in computer 100. Although this illustration only shows two users, a plurality of users may invoke the breakpoint manager 128. A first user 202 coupled to a first command processor 206 and a second user 204 coupled to a second command processor 208 are shown associated with the breakpoint manager 128. The first user 202 provides instructions to the first command processor 206 to execute or run a process using computer program 124. Before executing the computer program 124, the first command processor 206 may generate an establish-breakpoint message 210 to be incorporated into the program code of the computer program 124. The establish breakpoint message 210 is then received by the breakpoint manager 128. In this manner, the users may establish any number of breakpoints.

The breakpoint manager 128 stores breakpoint data 212 and implements the breakpoint by modifying the computer program 124. As an illustration, the computer program 124 is modified by inserting a software branch instruction, an interrupt or an invalid instruction into the program. The computer program 124 executes until a breakpoint is encountered. When a breakpoint is encountered, the interrupt handler 214 executes breakpoint processing instructions stored as the breakpoint data 212. The interrupt handler 214 interacts with the breakpoint manager 128 to ensure correct processing with respect to the first user 202 and the second user 204. As an illustration, processing includes altering the breakpoint data 212 and computer program 124 to delete a breakpoint by the breakpoint manager 128.

FIG. 2 also shows a Useful Breakpoint Set 218. The Useful Breakpoint Set 218 is a data structure to which breakpoints are selectively stored when program execution is halted by a user. In one embodiment, only those breakpoints associated with the user halting the program and which may actually be encountered during subsequent execution are placed into the Useful Breakpoint Set 218. These breakpoints are then reestablished when the program 124 regains control from the debugger and resumes execution. In another embodiment, useful breakpoints are determined according to user behavior. For example, if a user consistently ignores a breakpoint (i.e., spends no time examining the state of the program when the breakpoint is hit), then the breakpoint is not useful. Persons skilled in the art will appreciate other embodiments for determining useful breakpoints, all of which are within the scope of the present invention.

Figure 3:
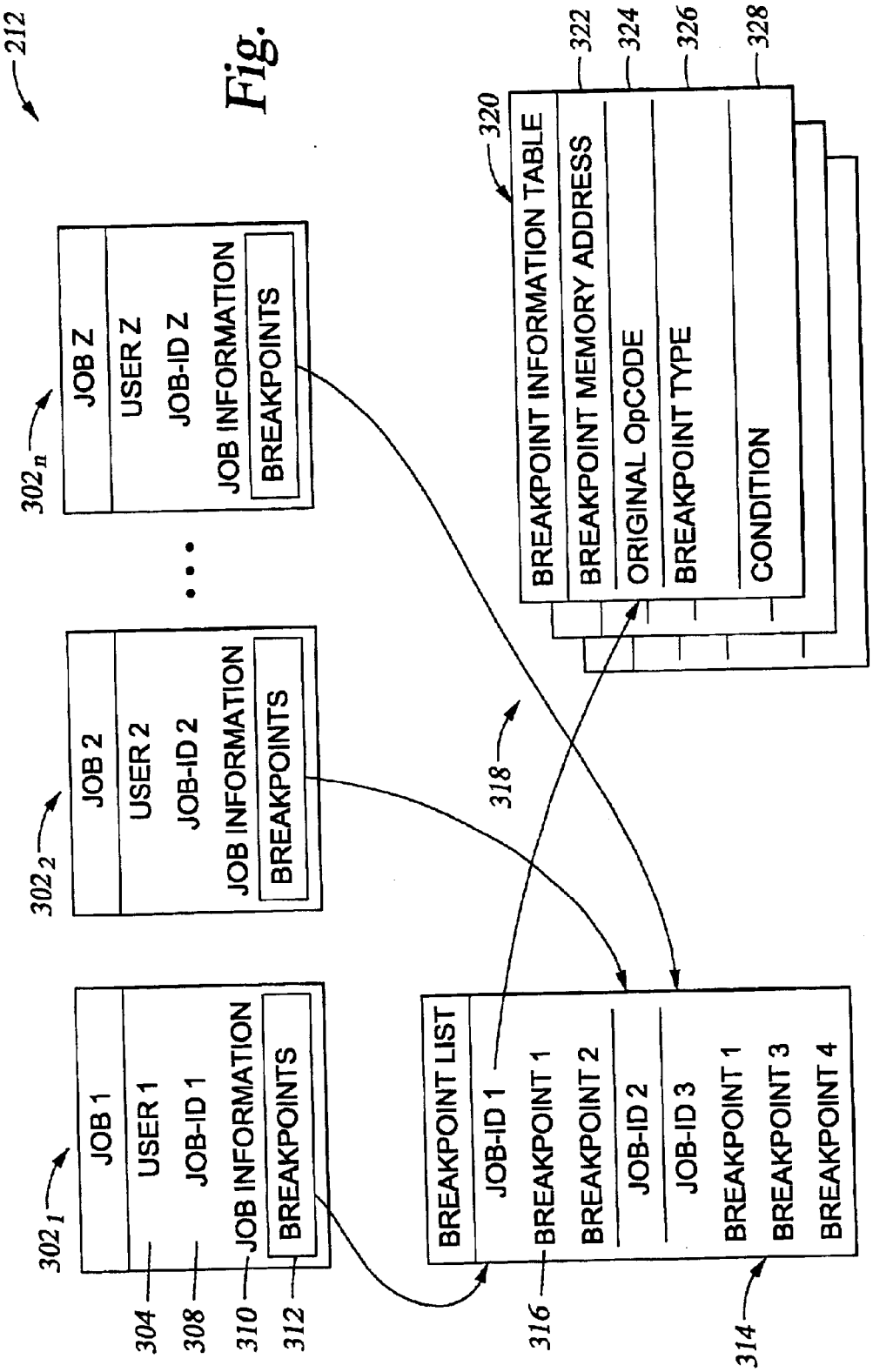
FIG. 3 is a diagram illustrating the establishment and handling of a breakpoint.

FIG. 3 illustrates one embodiment of the structure of the breakpoint data 212. The first and second command processors, 206, 208, respectively create a plurality of job records illustrated as JOB1 $302_1$, JOB2 $302_2$, and JOBZ $302_N$. As illustrated with reference to JOB1 $302_1$, each job record comprises a user identification (ID) 304 (illustrated as USER 1 in JOB1 $302_1$), a job identifier 308 (illustrated as JOB-ID 1 in JOB1 $302_1$), job information 310, and breakpoints 312. A breakpoint list 314 is created from the plurality of job records that is to be utilized by the breakpoint manager 128 and the interrupt handler 214. The breakpoint list 314 comprises a list of active breakpoints (i.e., breakpoints 312) referenced to the respective job identifiers. The breakpoint list 314 references a plurality of breakpoint information tables 318. Specifically, a first breakpoint 316 associated with JOB ID 1 points to a first breakpoint information table 320. Breakpoint information table 320 includes the breakpoint memory address 322 where the breakpoint resides in the main memory 118 and the original opcode 324 that was replaced by the breakpoint instruction. This original opcode 324 is used to return the computer program 124 to its original state when a breakpoint is removed and also to allow the breakpoint to be masked from other jobs. The breakpoint information table further includes the breakpoint type 326. A breakpoint can be either a normal breakpoint that can be encountered in any thread of the job in which the breakpoint was set or a thread specific breakpoint that can only be encountered in a specific thread. The condition 328 defines if a conditional breakpoint requires specific processing.

Figure 4:
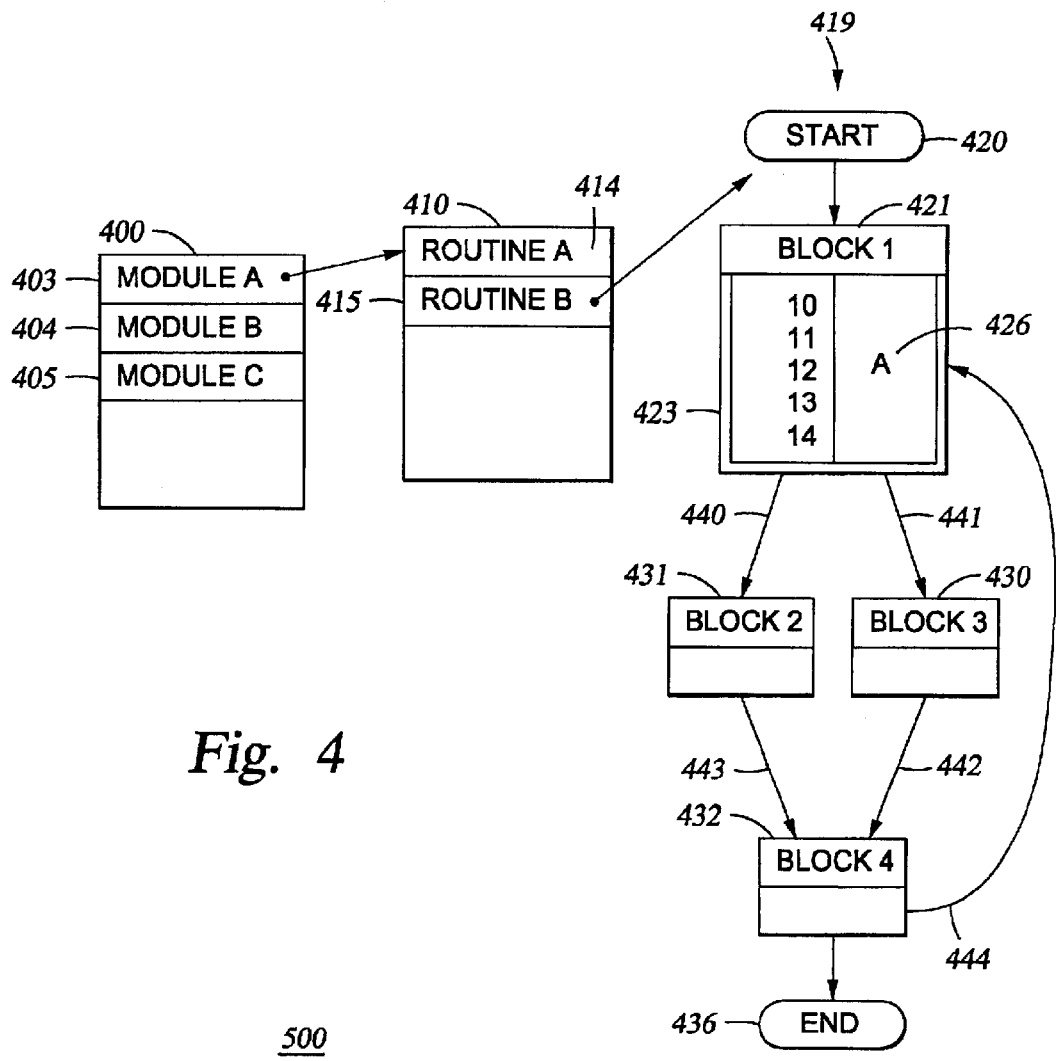
FIG. 4 is a depiction of the Control Flow Graph (CFG) and other related information stored with a program.

FIG. 4 illustrates one embodiment of a control flow graph 419 (CFG). Within program 124, the CFG 419 and related information is anchored by (pointed to or referenced by) a module list 400. As known in the art, each module is a separate compilation unit. These units start out in a form commonly known as a source file. Source files can be written in one of many computer languages, such as but not limited to C, C++, or ADA. These source files are then converted to object by a program called a compiler. The compiler processes the source file through a process known in the art as compilation and produces output commonly known as an object file. The object files are then linked together to produce program 124. The compiler also constructs the CFG 419 for later use by a breakpoint analysis routine 1300 (described below) according to embodiments of the invention.

The Module list 400 contains a plurality of one or more module records 403, 404, and 405. One record is provided for each object file or module used to build the program 124. Because each module can contain multiple routines (procedures or methods), each module record refers to a routine list 410. The routine list 410 contains a plurality of records, one for each routine in the module. Each record 414, through 415 in the routine list contains the name of the routine, and a reference to the CFG constructed for that routine.

CFG 419 comprises a start node 420 and an end node 436, and intermediary nodes 421, 430, 431, and 432, which are known in the art as basic blocks. A basic block is a sequence of consecutive statements in which flow of control enters at the beginning and leaves at the end without halt or the possibility of branching except at the end. Call statements do not break a basic block and may be contained within a basic block. These basic blocks are linked by arcs 440, 441, 442, 443, and 444, which specify possible program control flow between the blocks. An arc is a link connecting nodes and points to the next sequential node in the program.

Block 421 is representative of the structure of all the basic block nodes within CFG 419. Basic Block 421 contains a list of statements 423 that are the statements within program 124, module 403, and routine 415, that reside in block 421. List 423 contains statements 10, 11, 12,13, 14. In the event that a statement contains a call to another routine, such as with statement 11, statement list 423 also contains the name of the routine that is called at that statement, e.g., routine A in the case of statement 11. Those skilled in the art will realize that in the case of an object-oriented polymorphic call, multiple routines could be targeted. Thus, multiple routine names may be included in a field associated with a particular statement.

Figure 5:
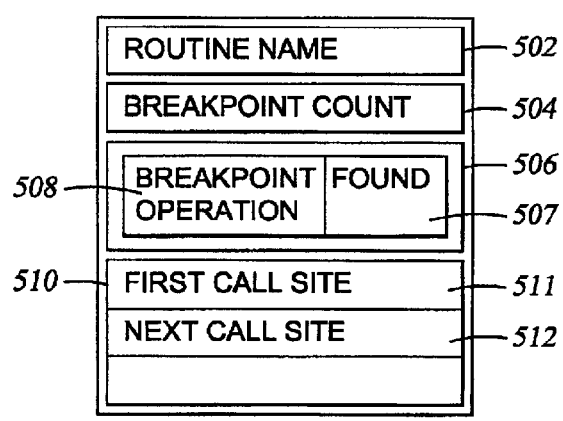
FIG. 5 is a detailed depiction of a node within a call flow graph.

FIG. 5 illustrates a single node 500 in a call flow graph. Illustratively, node 500 comprises a routine name 502, a breakpoint count 504, a breakpoint field 506, a found value 507, breakpoint operation 508, first call site 511 and next call site 512. The routine name 502 identifies the name of the routine that this node represents in the call graph. The breakpoint count 504 is the number of breakpoints that are currently set within the routine. Field 506 contains two subfields that are used to determine if further traversal of the call graph is needed. The found value 507 is the result that was found the last time this node was processed. If the value "yes" was stored in found value 507, that indicates that a breakpoint was encountered in the call graph below this point, or that this node has not previously been processed. The value "no" stored in found value 507 indicates that no breakpoint was found. Breakpoint Operation 508 is the number contained in Operation Count 600 (described below) the last time this node was processed. List 510 is a list of all call sites within routine name 502. Fields 511 and 512 are fields for two discrete call sites within routine 502. Though in the example in FIG. 5 each of the call sites (511 and 512) are shown to be a single link those skilled in the art will appreciate that if the call is a polymorphic method call, (i.e. the call depends on the value of the object against which the method is invoked) there may be multiple arcs from a single call site to different routines. Also, in the case the call uses a function pointer as its target, the compiler may supply an arc to each procedure that has had its address taken.

Figure 6:
FIG. 6 is a data structure representing a breakpoint operation count.

FIG. 6 illustrates one embodiment of the operation count 600. The operation count 600 is an integer value that is incremented every time a breakpoint is added or removed during a debug session. The operation count 600 is referenced to determine if the prior processing is still valid.

Figure 7:
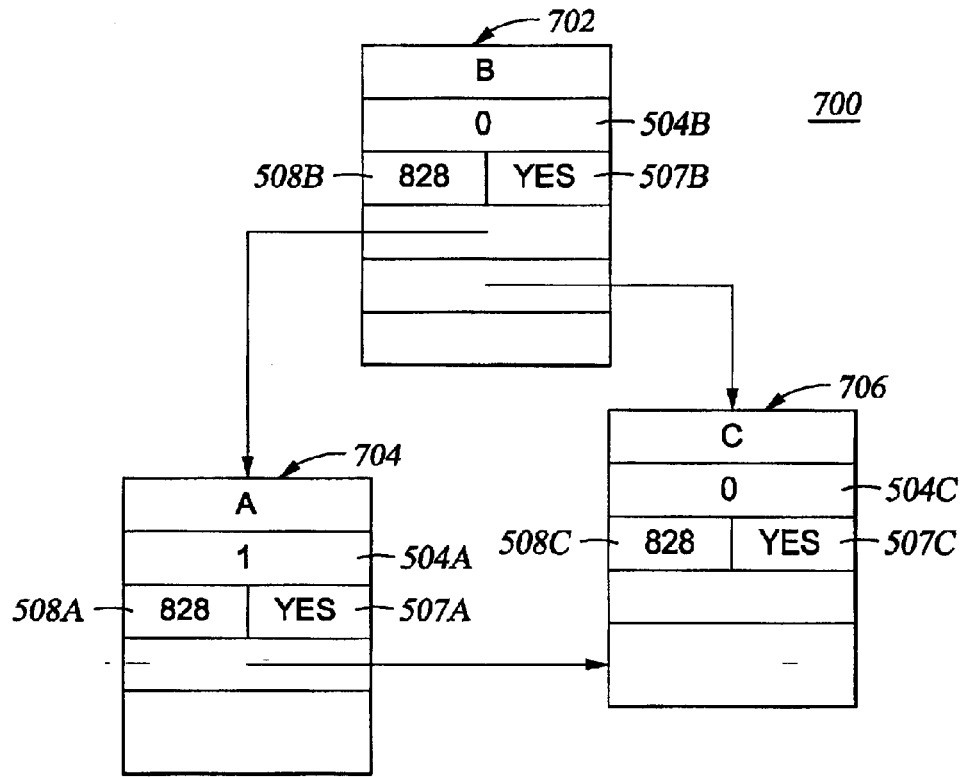
FIG. 7 is a block diagram that illustrates an example of a call graph.

FIG. 7 illustrates a block diagram of a call graph 700 otherwise known in the art as a call multi-graph. The call graph contains one node for every procedure in the computer program 124, where each node is configured as node 500 described above. Illustratively, three nodes 702, 704 and 706 are shown. Each call site within the call graph 700 has an entry contained in list 510. The call graph is created when the object files created by the compiler are linked together. In this illustration, routine B calls routine A and routine C. The breakpoint count 504B for routine B and the breakpoint count 504C for routine C indicate that neither routine has a breakpoint set in those routines. The breakpoint count 504A for routine A is set to 1 indicating that there is a single breakpoint set somewhere in the routine. The breakpoint operation 508A–C is set to the value 828 in each of the routines to identify the value stored in the operation count 600 the last time these routines were processed by a multi-graph test. A multi-graph test will be discussed below with reference to FIG. 15.

Figure 8A:
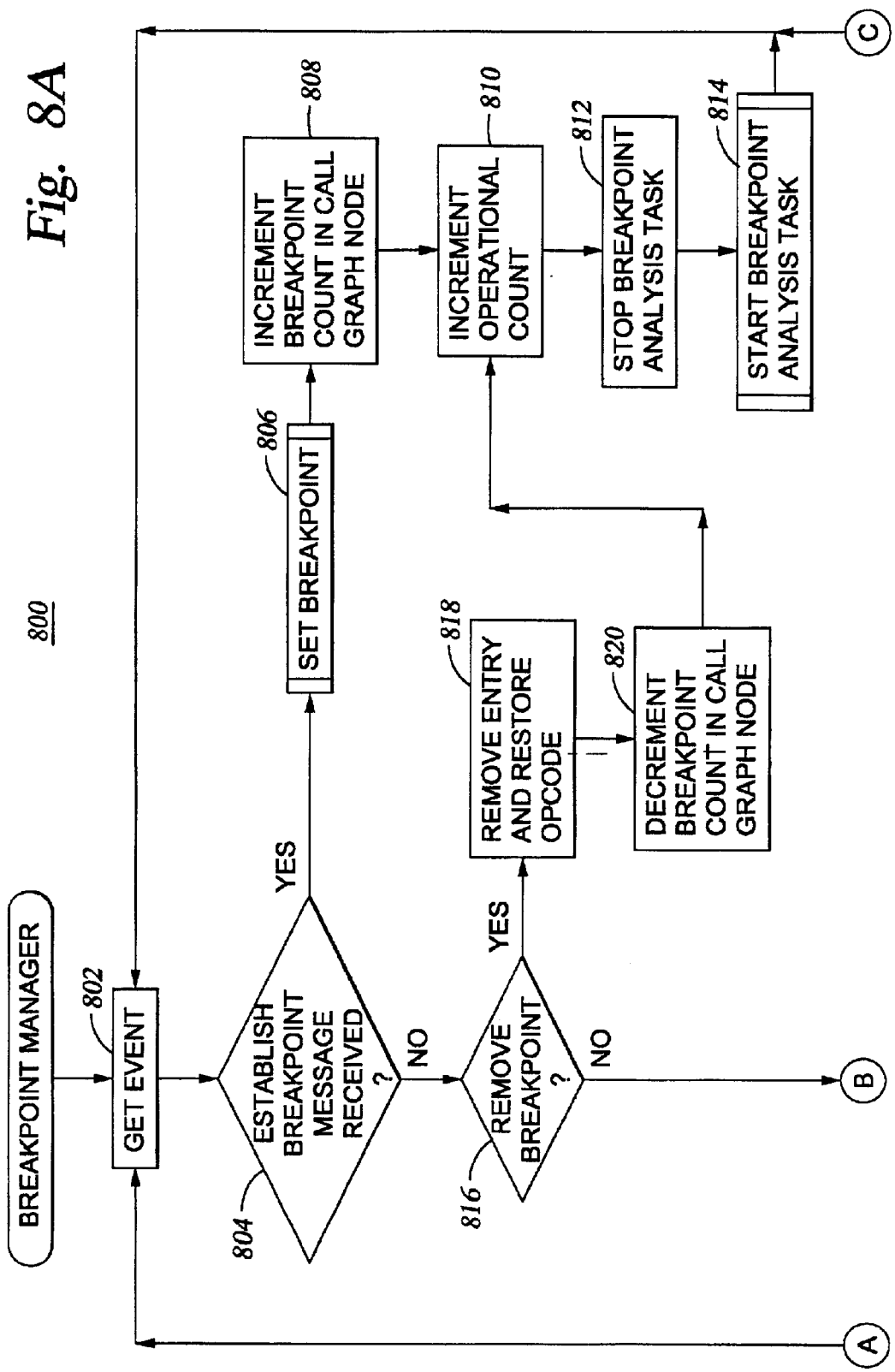
FIG. 8A is a flow diagram illustrating the operation of a breakpoint manager.
Figure 8B:
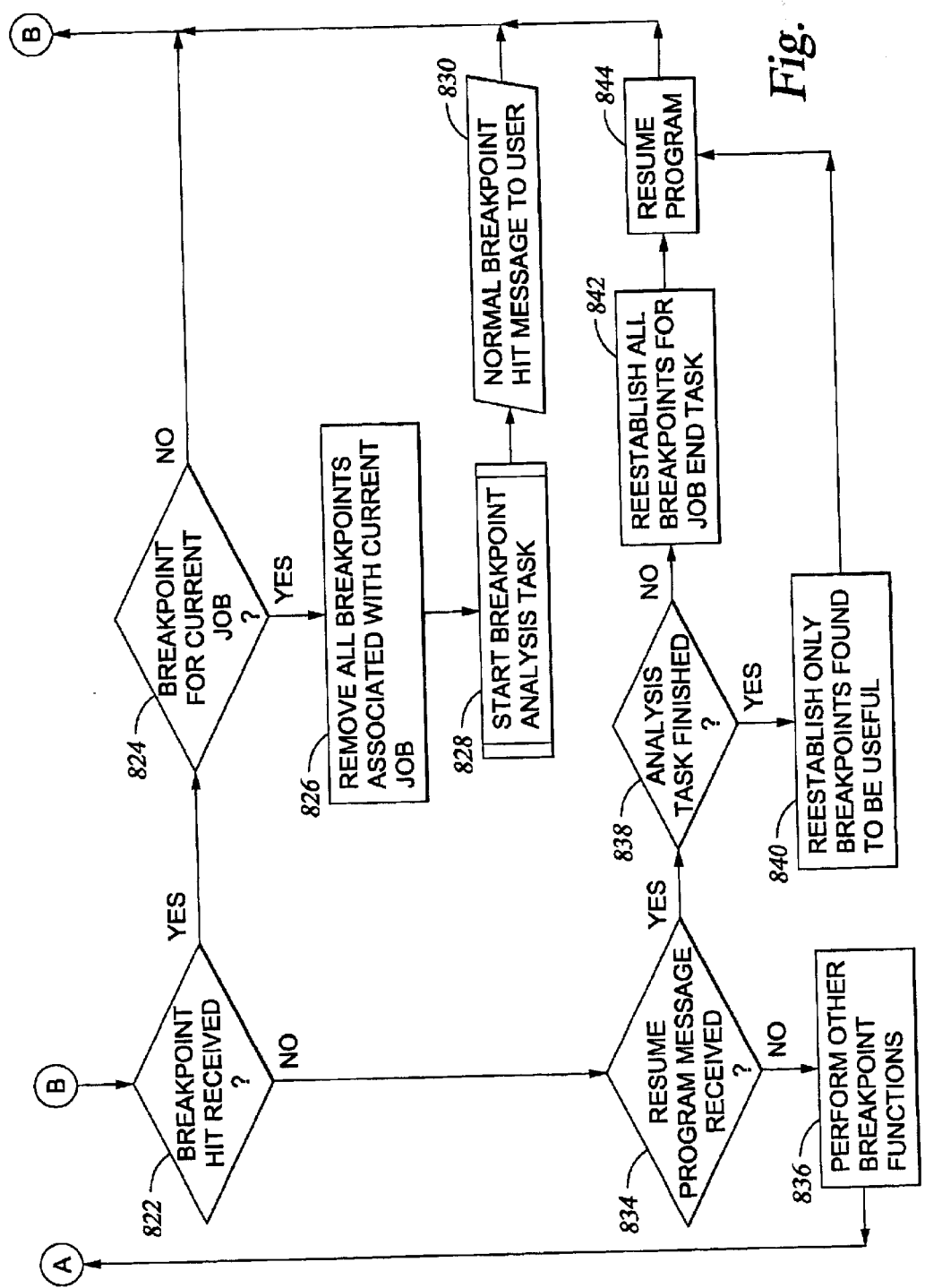
FIG. 8B is a continuation of the flow diagram beginning in FIG. 8A.

One embodiment illustrating the operation of the breakpoint manager 128 is shown as a breakpoint manager routine 800 in FIG. 8A and continued in FIG. 8B. The routine 800 is illustrated as an event-driven routine for the breakpoint manager 128. In an event-driven system, the breakpoint manager routine 800 waits for various events. In response to an event, the breakpoint manager routine 800 executes predetermined program code to handle the event. Once the event has been handled, the breakpoint manager routine 800 returns to a state of waiting for additional events.

It should be appreciated that routine 800 is but one suitable implementation of a breakpoint manager 128 consistent with the invention. Other implementations may use, for example, a procedural model. In general, the implementation of a programming environment 126 or other computer program consistent with the invention may utilize any known programming model, and it will be appreciated that such an implementation would be well within the capabilities of one of ordinary skill in the art having benefit of the disclosure presented herein.

The method 800 is entered at step 802 where the breakpoint manager 128 receives an event. At step 804, the method queries if the event is an establish breakpoint message. If so, the method proceeds to step 806 where a new breakpoint is set. At step 808, the breakpoint count 508 in the call graph node 500 for the appropriate routine is incremented. At step 810, the operational count 600 is incremented. When the operational count 600 is incremented, this indicates that the breakpoint configuration has changed and that any on-going break point analysis previously done will need to be re-computed. Thus, at step 812, any on-going breakpoint analysis task is stopped since the existence of a new breakpoint set in step 806 can affect the results of the analysis. At step 828, the breakpoint analysis task is restarted.

If step 804 is answered in the negative, the method 800 proceeds to step 816. At step 816, the method queries if the breakpoint should be removed (e.g., in response to an explicit user request). If answered affirmatively, the method proceeds to step 818 where the breakpoint entry is removed and the original opcode 324 (operational code) is restored. At step 820, the breakpoint count in the call graph node is decremented. The method then proceeds to step 810.

If step 816 was answered in the negative, the method 800 proceeds to step 822 where the method 800 queries if a breakpoint hit was received. If so, the method proceeds to step 824 where the method queries if the breakpoint is for the current job (process). This is done by accessing the breakpoint list 314. If the breakpoint is not for the current job (process), the method 800 returns to step 802, thereby masking the breakpoint from the current job (process). If the breakpoint is for the current job (process), the breakpoint is allowed to halt execution of the program and all of the breakpoints associated only with the current job are removed at step 826. This occurs because breakpoints are not useful when the program is halted. The method then proceeds to step 828 where the breakpoint analysis task is started. The breakpoint analysis task runs in the background to determine the breakpoints that are now useful given the current stopped position of each active routine in each thread. At step 830, a normal breakpoint hit message is sent to the user associated with the process. The method 800 then returns to step 802 to wait for another event.

If step 822 was answered negatively, the method 800 proceeds to step 834 where the method 800 queries if the event was a resume program message. If not, the method 800 performs other breakpoint functions at step 836, such as viewing currently set breakpoints, and then returns to step 802 to wait for another event.

If at step 834 the event was a resume program message, the method 800 proceeds to step 838 where the method 800 queries if the analysis task is finished. If so, only breakpoints found useful are re-established at step 840 and the program is resumed at step 844. If step 838 is answered negatively, all breakpoints for the job are re-established and the analysis task is terminated at step 842. The program then resumes at step 844. In either case, resuming the program at 844 involves emulating the saved opcode that was replaced when the breakpoint was set. The method then proceeds to step 802 to wait for another event.

In another embodiment, all breakpoints are indiscriminately reestablished when control returns to the program. That is, all breakpoints are removed from the program when the debugger gets control and all breakpoints are re-established when the debugger returns control to the program. This approach provides the advantages of simplicity and low-cost because no break point analysis is needed.

Persons skilled in the art will readily recognize other embodiments for removing and/or re-establishing breakpoints, all of which are within the scope of the present invention.

Figures 9, 10:
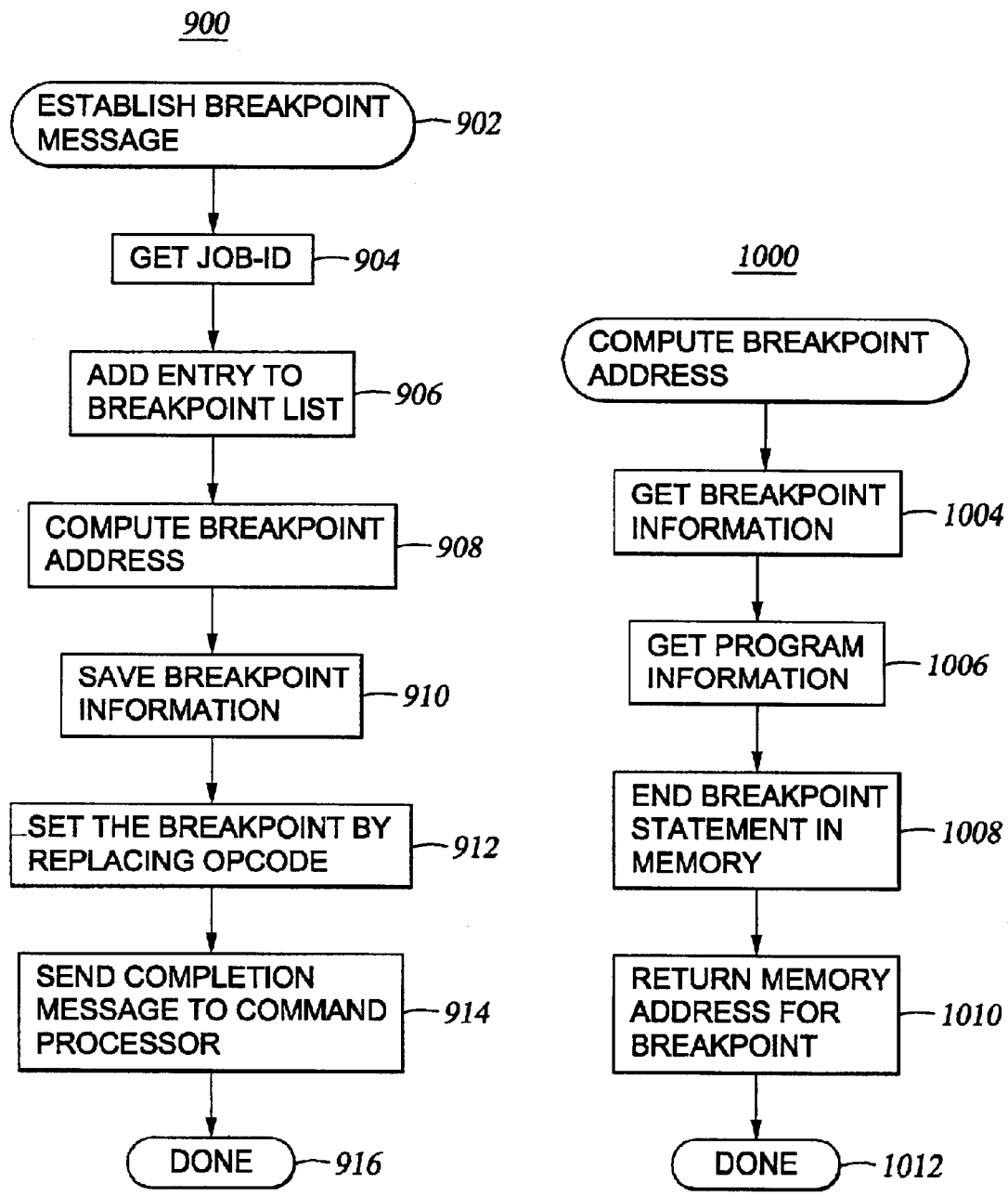
FIG. 9 is a flow diagram of the establish breakpoint message routine referenced in FIG. 2.
FIG. 10 is a flow diagram of the compute breakpoint memory address routine referenced in FIG. 9.

Referring now to FIG. 9, an establish breakpoint message method 900 is illustrated. Method 900 is one embodiment of step 806 which is invoked when step 804 is answered affirmatively. At step 904, the job identifier 316 is retrieved. At step 906, the breakpoint manager adds an entry to the breakpoint list 314. The breakpoint address in memory is then computed in step 908 and the returned breakpoint address location is saved in the information table 320 at step 910. At step 912, the breakpoint is set by substituting the current instruction or OpCode 324 (operations code) with the breakpoint in memory 118. At step 914, a completion message is returned to the command processor 206.

FIG. 10 illustrates a method 1000 for computing a breakpoint address shown as step 908 in FIG. 9. At step 1004, breakpoint information is retrieved. The information illustratively may reside in a data structure containing a program ID, a statement number or other data identifying where the breakpoint is to be inserted. One such data structure is described below with reference to FIG. 11. Program information is retrieved at step 1006. One embodiment of a data structure containing the program information is described below with reference to FIG. 12. At step 1008, the breakpoint statement is located in memory 118. Then the address of the breakpoint in memory 118 is returned at step 1010.

Figure 11:
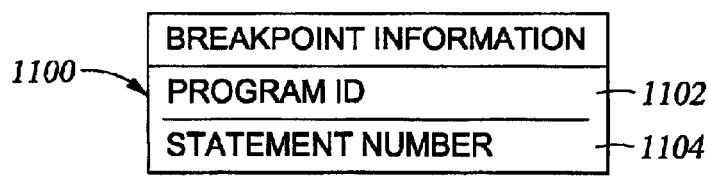
FIG. 11 is a data structure depiction of breakpoint information referenced in FIG. 10.

FIG. 11 shows one embodiment of a data structure 1100 containing the breakpoint information retrieved at step 1004 of method 1000. As an illustration, the breakpoint information comprises a program ID 1102 identifying the software program 124 and the fine number 1104 in the software program 124 where the breakpoint is to be inserted.

Figure 12:
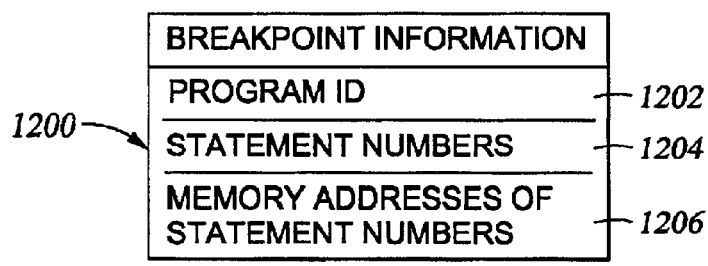
FIG. 12 is a data structure depiction of program information referenced in FIG. 10.

FIG. 12 illustrates one embodiment of a data structure 1200 illustrating the program information retrieved at step 1006 of method 1000. As an illustration, the program information comprises a program ID 1202 identifying the software program 124, the statement numbers 1204 and a map 1206 of the memory addresses of statement numbers.

Figure 13:
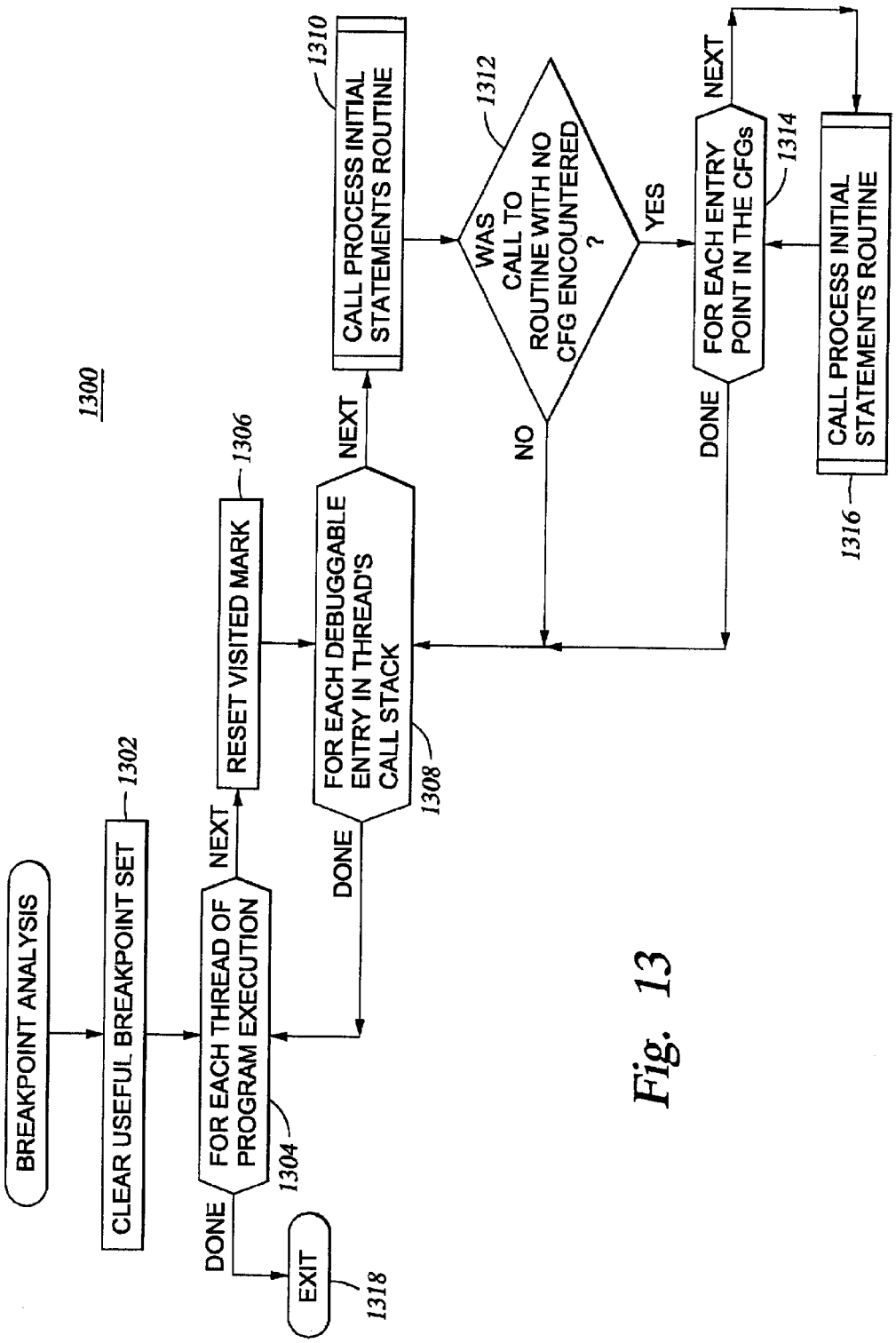
FIG. 13 is a flow diagram of the breakpoint analysis routine referenced in FIG. 8.

FIG. 13 illustrates one embodiment of a breakpoint analysis 1300. The breakpoint analysis 1300 collects the set of useful breakpoints based on the stopped position of the various threads and active routines of the program. In one embodiment, the breakpoint analysis 1300 is executed as a background process or thread. While it is advantageous to run analysis 1300 as a background task, those skilled in the art will appreciate other methods in which runtime 1300 is not executed simultaneously with the breakpoint manager 128 without deviating from the scope of this inventions.

If the analysis is not completed by the time execution of the program resumes, then all breakpoints are assumed to be useful and all breakpoints are reestablished. In the case of a client based debugger, which debugs code and resides on a server system, by use of a cooperating routine on the server known in the art as a debug engine, it is contemplated that the breakpoint analysis 1300 could run on the server while the user of the client debugger is analyzing the data associated with the current stopped position.

The breakpoint analysis 1300 starts execution at step 1302 and first clears all the breakpoints from the useful breakpoint set 218. Then at step 1304 the breakpoint analysis 1300 begins its analysis by determining which breakpoints are reachable from the stopped positions within the active procedures of each thread. For every thread of execution in the process being debugged, control proceeds to step 1306 which resets a visited mark (e.g., by incrementing a counter representing the value that indicates a node has been visited for this thread). The visited mark allows the analysis to examine the same nodes of the control flow graph for more than one thread. This is necessary because thread specific breakpoints may affect statements that are reachable. A thread specific breakpoint is one that can only be hit by the thread that set it. If the analysis for an earlier thread encounters a breakpoint specific to that thread then that analysis will proceed no further, but if analysis for a subsequent thread reaches that point in the CFG it will be unaffected by the thread specific breakpoint and be allowed to continue.

From step 1306 control proceeds to step 1308 which examines the call stack for the thread. For each routine on the call stack found to be debuggable, step 1310 is invoked to determine the useful breakpoints given the current stopped position in this particular routine. Control then proceeds to decision step 1312 which is answered affirmatively when a call to a routine has been encountered for which the debugger is unable to find a CFG. In this case, the debugger does not know which routines may be called within this thread by this unknown routine and must assume that any routine may have been called. If decision step 1312 is answered negatively, control will be directed back to step 1308 where the next debuggable entry in the thread's call stack will be processed.

Referring again to decision step 1312, if there was a routine for which no control flow information could be found, control proceeds to step 1314 which visits every routine in routine list 410 of every module in module list 400, such that any routine that is part of program 124 will be included. For each of these, step 1316 will process their CFG not from the current stopped position, but from the beginning of the control flow graph since it is unknown if the routine for which no control flow information is available may have called one of these routines. Illustratively, there are multiple methods that can be applied within the scope of the invention, which include, recognizing the library routines by name and ignoring them, or supplying minimal control flow information with them. Those skilled in the art will appreciate that the runtime library routines are routines that are not created by the user, but supplied with the operating system and as such will not be compiled with debug data, and may not contain a CFG. The majority of library routines will not transfer control back to the user code until after they complete and return. There are, therefore, no breakpoints that can be missed by not following the breakpoints' true control flow. There are many ways in which these runtime library routines can be handled that will not cause the debugger to later have to make such pessimistic assumptions about what routines may have been called. One solution would be simply to know the name of each of these routines and special case them. Another solution would be to provide a minimal control flow graph for each library routine.

In other embodiments, the analysis at step 1314 may not be performed. Instead, the method will simply terminate if a routine is called and control flow information is not available, resulting in flagging all breakpoints as useful. Illustratively, calls through function pointers usually cannot be resolved at compile time, and thus it must be assumed that any routine with its address taken may have been called.

Once the loop entered at step 1314 is completed, processing returns to step 1308. Once the loop entered at step 1308 is completed, processing returns to step 1304. Once the loop entered at step 1304 is completed, the analysis 1300 exits and processing returns to FIG. 8.

Figure 14:
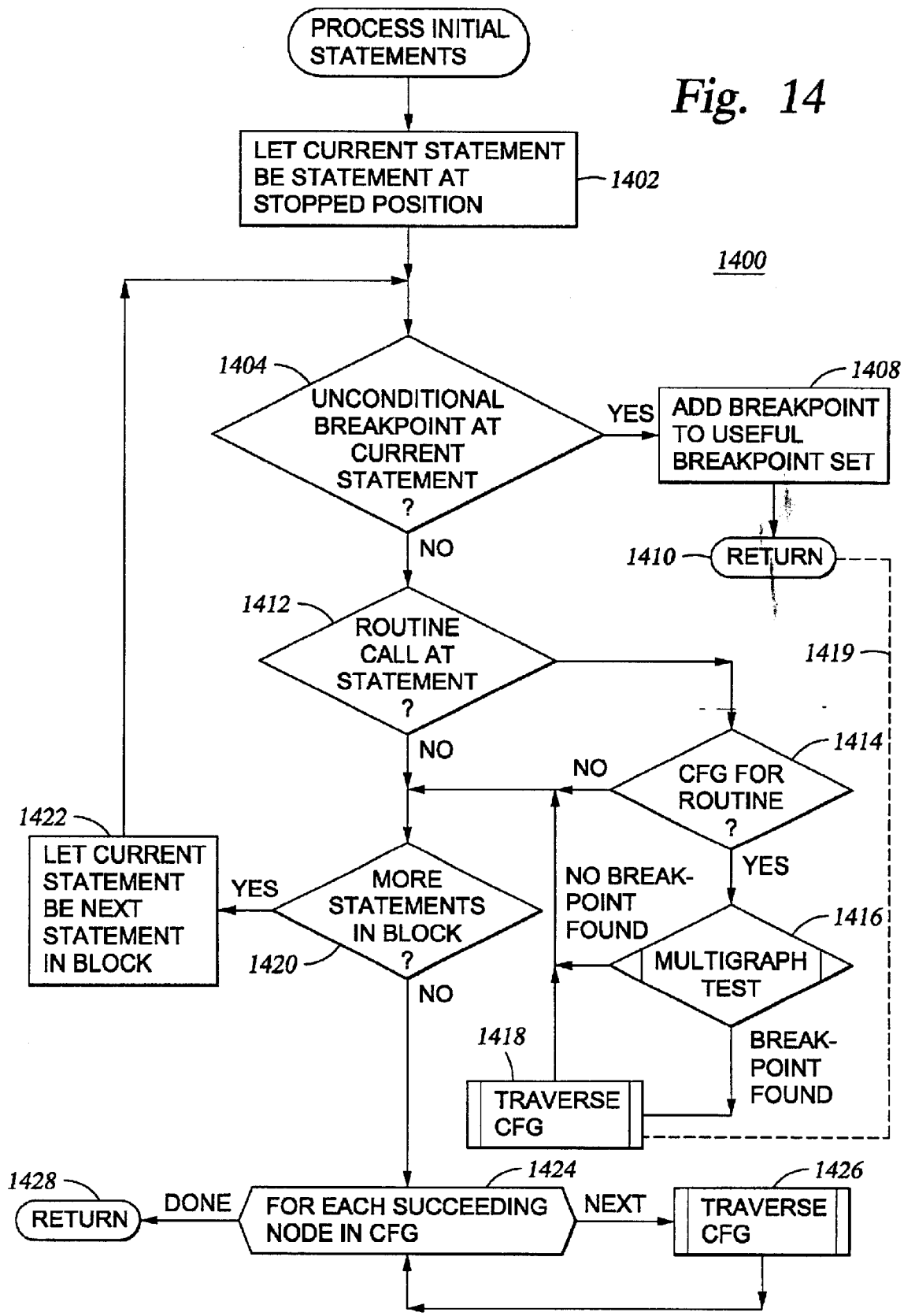
FIG. 14 is a flow diagram of the process initial statements routine referenced in FIG. 13.

FIG. 14 illustrates one embodiment of a Process Initial Statements routine 1400 which is entered from steps 1310 and 1316. The Process Initial Statements routine 1400 will process the statements starting with the current stopped position within the basic block and proceeding, statement by statement, to the end of the basic block where a Traverse CFG routine (described below with respect to FIG. 16) will take over and handle the remaining basic blocks. Step 1402 finds which statement for the current procedure maps to the current stopped position. More than one routine in a given thread may have a valid stopped position. In the case of the routine that hit a breakpoint, the stopped position will be at the point of the breakpoint, but the procedure that called the routine that hit the breakpoint also has a valid stopped position. That stopped position is at the point where the called routine hit the breakpoint. As a further illustration, any procedure that is currently active within the thread (i.e. has an entry on the call stack) will have a valid stopped position.

The routine then proceeds to step 1404 which answers affirmatively if there is an unconditional breakpoint at the current statement that will activate if encountered by the current thread. If step 1404 is answered affirmatively, then program execution reaching this point would stop at this breakpoint, and would not proceed further down this path of the CFG. Accordingly, at step 1408 the breakpoint is added to the useful breakpoints set 218, because the breakpoint was encountered. At step 1410, the routine 1400 returns because program control cannot reach any breakpoints beyond the current statement. Conditional breakpoints are not handled at this point because they may or may not activate if program control reaches them based on the condition that they evaluate. Those skilled in the art will appreciate that in some cases additional analysis could be done which could determine that some conditional breakpoint will actually fire the next time program control reaches them. In this case, such breakpoints could be handled by step 1404 answering affirmatively.

If at step 1404 the answer is in negative, then control proceeds to step 1412 that tests to see if a call statement is present within the current statement. If so, the step 1412 will answer affirmatively. In this case, program control will flow into the called procedure, so routine 1400 must attempt to follow it. To this end, control proceeds to step 1414 where routine 1400 determines if the debugger has access to a Control Flow Graph for the procedure called. The debugger is unable to follow control into this procedure if it can not obtain a CFG for the procedure. If control proceeds to a part of the program that the debugger does not have control flow information about, the debugger will have to make some pessimistic assumptions about what routines may have been called.

Referring again to 1414 if a CFG cannot be found, control will proceed to step 1420. If a CFG is found for the current routine, then control proceeds to 1416 where a Multigraph Test routine is called. An illustrative Multigraph Test routine is described below with reference to FIG. 15. The purpose of Multigraph Test routine is to quickly determine if there is any possibility at all of hitting a breakpoint from this program call. The call to routine 1416 can be omitted at the expense of performance, with the routine 1400 proceeding as if a breakpoint hit was possible. If it is determined at step 1416 that a breakpoint hit is possible, the Multigraph Test routine returns "breakpoint found" and proceeds to step 1418 which processes the control flow graph for the routine to be called at this statement by program 124. In one embodiment, control then proceeds to step 1420. However, it some cases it may have been conclusively determined at step 1418 that a breakpoint can be encountered from the present state of the program. In this case, a logic path 1419 is taken to return at step 1410.

If at step 1416 a breakpoint cannot be found, then there is no reason to perform the finer resolution analysis done at step 1418, since no useful breakpoint will be found. Therefore, control proceeds to step 1420.

Step 1420 determines if there are more statements in the basic block. If so, control proceeds to step 1422 which sets the current statement to be the next statement in the basic step and then control proceed back to step 1404 where the previously described sequence is repeated for this next statement.

If at step 1420 it is determined that there are no statements left in the basic block, then at step 1420, the routine will loop through each of the nodes in the CFG for which there is an arc to from the current node, and call a Traverse CFG routine to process each of them. An embodiment of the Traverse CFG routine is described below with reference to FIG. 16. After each of these nodes has been processed control proceeds to step 1428 which causes control to return to FIG. 13.

Figure 15:
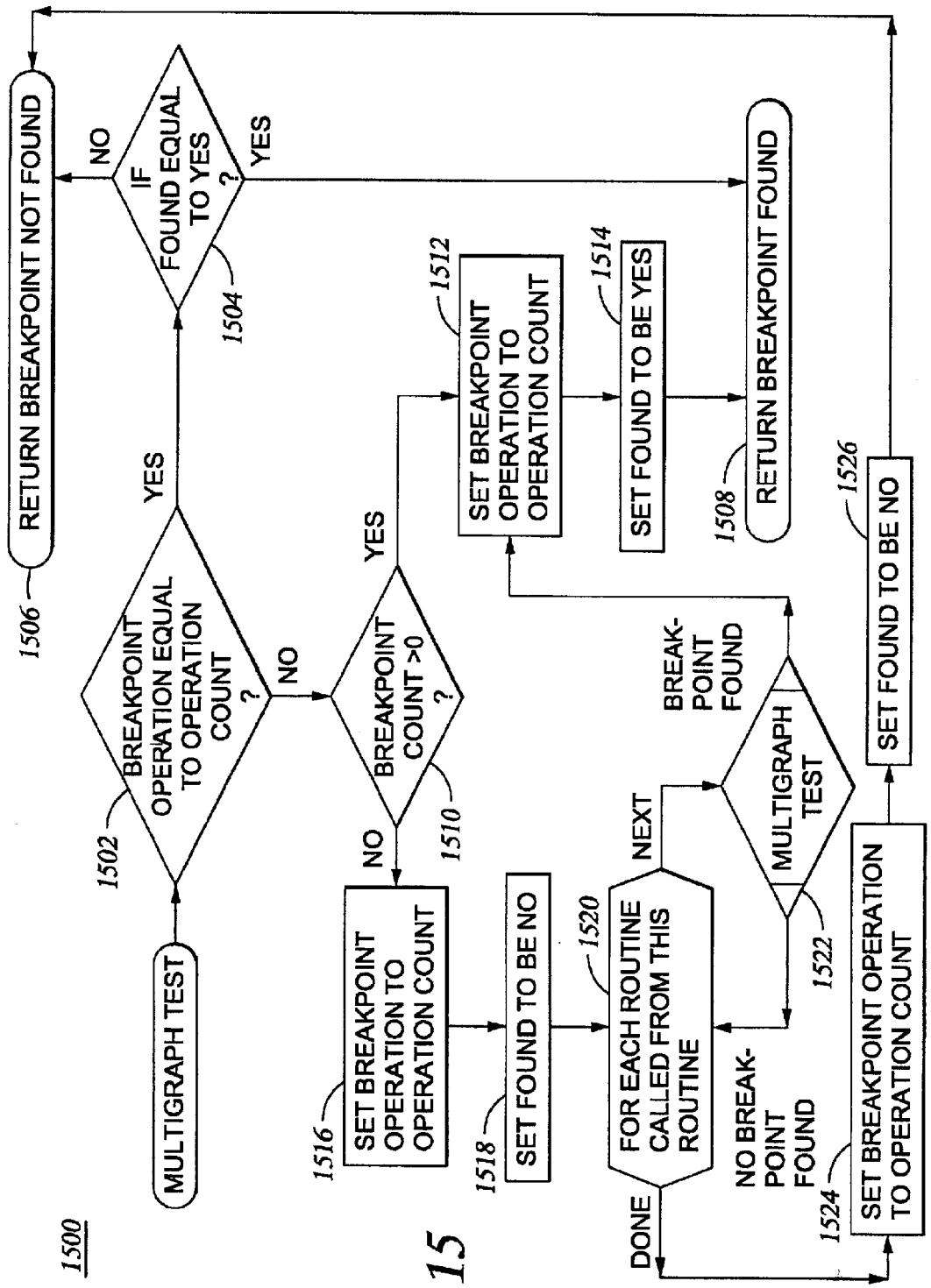
FIG. 15 is a flow diagram of the Multigraph Test routine referenced in FIG. 14, and FIG. 16.

FIG. 15 illustrates one embodiment of a multi-graph test 1500. This multi-graph test 1500 processes nodes in the call graph 700 (described with reference to FIG. 7) to determine if it is even possible to hit a breakpoint because of calling a particular procedure. The multi-graph test 1500 starts with a node in the call graph that represents the routine to be called by computer program 124. At step 1502 the node is checked to see if it has already been processed while the program breakpoints were still in their current configuration. It does this by comparing the Breakpoint Operation 508, to the Operation Count 600 and if the two are equal then the breakpoint configuration has not changed since no breakpoints have been added or removed since this node was last processed. If the Breakpoint Operation 508 of the current node and Operation Count 600 are equal, control flows to step 1504. At step 1504, the found value 507 is checked for the current node. Step 1504 is answered negatively if the found value 507 is "No", and is answered affirmatively if the found value 507 is "Yes". If the found value 507 is "No", control proceeds to step 1506 which returns an indication that the breakpoint is not found and can not be hit as a result a call to this routine. If the found value 507 is "Yes", an indication is returned (at step 1508) that a breakpoint can possibly be hit.

Referring again to step 1502, if the Breakpoint Operation 508 and Operation Count 600 do not match, then the breakpoint configuration may have changed since breakpoints have been added or removed. In this case step 1502 answers negatively and control proceeds to step 1510. At step 1510, it is determined if there are breakpoints in the routine associated with the current node of the call graph. If a breakpoint is set, then the Breakpoint Count 504 will be found to be greater than zero and control will proceed to step 1512 which will update field Breakpoint Operation 508 with the current value of Operation Count 600 thus marking the node as currently processed. At step 1514, found value 507 is set to "Yes" since a breakpoint may be hit, because there is a breakpoint within this routine. Control then proceeds to step 1508 which returns an indication that a breakpoint may be hit.

Referring again to step 1510, if the breakpoint count is equal to zero then there is not a breakpoint set in the current routine, control will then proceed to step 1516. Steps 1516 and 1518 have the purpose of marking a node in the call graph as visited, thus preventing an endless loop. Step 1516 updates field 508 with the current value of the Operation Count 600. The step 1518 sets the value of Found field 507 to be "No" so that if this node is again encountered at step 1522 (described below) it will not take the Breakpoint found case and return, but simply continue to step 1520 and process the next routine. After step 1518, control proceeds to step 1520, which loops though each entry in list 510 for the current node in the call graph. For each entry, decision step 1522 is invoked whereby the multigraph test is called recursively. If it is determined that a breakpoint cannot be hit, control proceeds back to 1520 to try the next routine. On the other hand, if step 1522 determines that a breakpoint can be hit, then control proceeds to step 1512. Once all of the entries in list 510 have been processed at step 1520, control proceeds to step 1524 which marks the node as processed by setting Breakpoint Operation field 508 equal to Operation Count 600. The method 1500 then proceeds to step 1526 which sets the found value 507 to "No" because the breakpoint could not be found. The method 1500 then proceeds to step 1506 which returns an indication as such.

Figure 16:
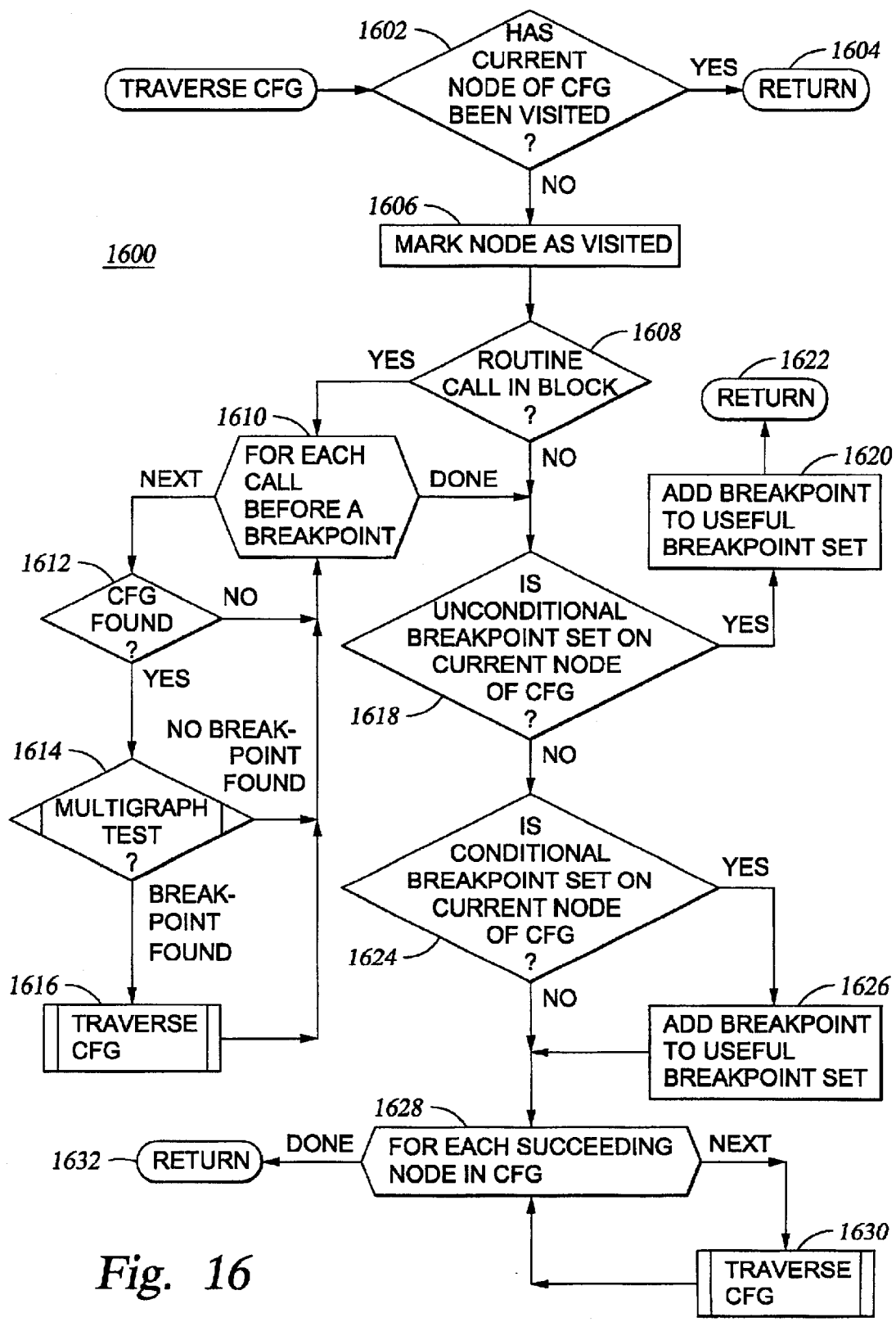
FIG. 16 is a flow diagram of the Traverse CFG routine referenced in FIG. 14.

FIG. 16 illustrates a Traverse CFG 1600 routine which is called at steps 1418 and 1426 of routine 1400. Routine 1600 first asks at step 1602 if the current node of the control flow graph has been visited since the visited indicator was reset at step 1306 of FIG. 13. If so, then step 1602 answers affirmatively and the routine 1600 returns at 1604. If the node has not been visited, then control proceeds to step 1606 where the node is marked with the current visited indicator.

Decision step 1608 determines if there is a call to another routine within the block. If so, control proceeds to step 1610. At step 1610, each statement in the block is examined until an unconditional breakpoint is encountered, or the end of the basic block is reached. For each statement that contains a call statement, control is passed to step 1612. Step 1612 determines if a control flow graph can be located for the routine called. If not, control must return to step 1610 and later processing (starting at step 1312 of FIG. 13) will have to make pessimistic assumptions. If the CFG for the routine is found, then step 1614 determines if it is possible to hit a breakpoint as a result of this call, and if so control proceeds to step 1616 to process the CFG for the current routine. If step 1614 had determined it was not possible to hit a breakpoint as a result of calling the routine called at this statement, then control would proceed back to step 1610 to proceed to the next routine. Once all the routine calls in the block have been processed, or if at step 1608 no routine calls were found within the basic block, then control would proceed to decision step 1618. Step 1618 determines if there is an unconditional breakpoint that can activate for the current thread set in the basic block. If there is, then decision step 1618 answers affirmatively, and control proceeds to step 1620. Step 1620 adds the first unconditional breakpoint found in the step to the useful breakpoint set 218. Although not indicated in FIG. 16, if any conditional breakpoints are found prior to this step, they too will be added to the useful breakpoint set. Control then proceeds to step 1622 to return since program control cannot proceed past the breakpoint found.

If no unconditional breakpoint was located at step 1618 then control proceeds to step 1624 to ask if a conditional breakpoint is present. If so, then all the conditional breakpoints present in the block are added to the Useful Breakpoint Set 218. After step 1626, or if step 1624 is answered in the negative, control proceeds to step 1628 which loops through every node in the CFG for which there is an arc from this current node. For each of these nodes, control is transferred to step 1630 that processes each node. When all the nodes have been processed, the routine 1600 proceeds to step 1632 which returns control to FIG. 14.

While the foregoing is directed to embodiments of the present invention, other and further embodiments of the invention may be devised without departing from the basic scope thereof, and the scope thereof is determined by the claims that follow.

What is claimed is:

1. A method of debugging a program in a computer system, comprising:

automatically removing at least a portion of all breakpoints associated with a particular job from the program when a debugger gets control of the program for the particular job; and upon returning control from the debugger to the program, automatically reestablishing at least one useful breakpoint from the removed breakpoints wherein the at least one useful breakpoint is determined by one of:

executing a task to identify each unexecuted breakpoint located in an unexecuted portion of the program; and analyzing a behavior of a user responsible for setting the at least one useful breakpoint.

2. A method of debugging a program in a computer system, comprising:

automatically removing at least a portion of all breakpoints associated with a particular job from the program when a debugger gets control of the program for the particular job; and upon returning control from the debugger to the program, automatically reestablishing at least one useful breakpoint from the removed breakpoints, wherein upon returning control from the debugger to the program at least one thread is prevented from continuing execution and wherein any breakpoints which may have been encountered only by the at least one thread during continuing execution are considered useless and are not reestablished.

3. A method of debugging a program in a computer system, comprising:

upon a debugger getting control of the program for a particular job, determining whether at least one useful breakpoint exists in the program for the particular job;

if so, removing from the program all breakpoints associated with the particular job except the at least one useful breakpoint;

prior to returning control to the program from the debugger, determining whether at least one of the removed breakpoints is useful; and if so, reestablishing the at least one of the removed breakpoints;

wherein at least one of (i) determining whether at least one useful breakpoint exists in the program for the particular job and (ii) determining whether at least one of the removed breakpoints is useful comprises executing a task to identify at least one breakpoint which may be encountered upon resuming execution of the program.

4. The method of claim 3, wherein at least one of the at least one useful breakpoint and the at least one of the removed breakpoints is determined by analyzing a behavior of a user responsible for setting the respective breakpoint.

5. The method of claim 3, further comprising returning control to the program.

6. A method of debugging a program in a multi-user computer system, comprising:

during a time when execution of the program is halted, removing all breakpoints associated with a particular job from the program;

executing a task to identify each useful breakpoint located in the program, wherein a useful breakpoint is one which may be encountered upon resuming execution of the program; and if the task is completed before execution of the program is resumed, inserting each useful breakpoint into its original location in the program.

7. The method of claim 6, wherein the multi-user computer system is a single level store computer.

8. The method of claim 6, wherein the task is restarted in an event of removing and establishing at least one breakpoint.

9. The method of claim 6, further comprising inserting all removed breakpoints in the program if the task is not completed when execution of the program is resumed.

10. The method of claim 6, wherein the task is executed in response to hitting a breakpoint and wherein the task is restarted in an event of removing and establishing at least one breakpoint.

11. The method of claim 6, wherein executing the task comprises at least one of traversing a control flow graph of the program and traversing a call graph of the program.

12. The method of claim 6, wherein executing the task comprises:

determining whether a call to a routine is made from a current routine at which execution halted; and if so, determining whether at least one of the routine and a called routine called from the routine contains a breakpoint;

if so, adding the breakpoint to a useful breakpoint set.

13. The method of claim 12, wherein determining whether at least one of the routine and the called routine contains a breakpoint comprises:

accessing a value in a call graph node of the routine, wherein the value is indicative of whether the at least one of the routine and the called routine contains the breakpoint;

if the value indicates a presence of the breakpoint, traversing each node of a control flow graph, beginning with a node containing the routine.

14. The method of claim 13, wherein the task is performed for each routine of each thread of execution of the program.

15. A computer readable medium, comprising a program which, when executed by a processor in a multi-user system performs operations, comprising:

automatically removing at least a portion of all breakpoints associated with a particular job from the program when a debugger gets control of the program for the particular job; and upon returning control from the debugger to the program, automatically reestablishing at least one useful breakpoint from the removed breakpoints;

wherein the at least one useful breakpoint is determined by one of;

executing a task to identify each unexecuted breakpoint located in an unexecuted portion of the program; and analyzing a behavior of a user responsible for setting the at least one useful breakpoint.

16. A computer readable medium, comprising a program which, when executed by a processor in a multi-user system performs operations, comprising:

automatically removing at least a portion of all breakpoints associated with a particular job from the program when a debugger gets control of the program for the particular job; and upon returning control from the debugger to the program, automatically reestablishing at least one useful breakpoint from the removed breakpoints;

wherein upon returning control from the debugger to the program at least one thread is prevented from continuing execution and wherein any breakpoints which may have been encountered only by the at least one thread during continuing execution are considered useless and are not reestablished.

17. A computer readable medium, comprising a program which, when executed by a processor in a multi-user system performs operations, comprising:

during a time when execution of the program is halted, removing all breakpoints associated with a particular job from the program;

executing a task to identify each useful breakpoint located in the program, wherein a useful breakpoint is one which may be encountered upon resuming execution of the program; and if the task is completed before execution of the program is resumed, inserting each useful breakpoint into its original location in the program.

18. The computer readable medium of claim 17, wherein the multi-user computer system is a single level store computer.

19. The computer readable medium of claim 17, wherein the task is restarted in an event of removing and establishing at least one breakpoint.

20. The computer readable medium of claim 17, further comprising inserting all removed breakpoints in the program if the task is not completed when execution of the program is resumed.

21. The computer readable medium of claim 17, wherein the task is executed in response to hitting a breakpoint and wherein the task is restarted in an event of removing and establishing at least one breakpoint.

22. The computer readable medium of claim 17, wherein executing the task comprises at least one of traversing a control flow graph of the program and traversing a call graph of the program.

23. The computer readable medium of claim 17, wherein executing the task comprises:

determining whether a call to a routine is made from a current routine at which execution halted; and if so, determining whether at least one of the routine and a called routine called from the routine contains a breakpoint;

if so, adding the breakpoint to a useful breakpoint set.

24. The computer readable medium of claim 23, wherein determining whether at least one of the routine and the called routine contains a breakpoint comprises:

accessing a value in a call graph node of the routine, wherein the value is indicative of whether the at least one of the routine and the called routine contains the breakpoint;

if the value indicates a presence of the breakpoint, traversing each node of a control flow graph, beginning with a node containing the routine.

25. The computer readable medium of claim 24, wherein the task is performed for each routine of each thread of execution of the program.

26. The computer readable medium of claim 17, wherein executing the task comprises, for each routine of each thread of execution of the program:

determining whether a current statement at which execution halted contains an unconditional breakpoint; and if so, adding the unconditional breakpoint to a useful breakpoint set.

27. The computer readable medium of claim 26, further comprising, if the current statement at which execution halted does not contain an unconditional breakpoint:

determining whether a call to another routine is made; and if so, determining whether at least one of the another routine and a called routine called from the another routine contains a breakpoint;

if so, adding the breakpoint to the useful breakpoint set.

28. The computer readable medium of claim 27, wherein determining whether the at least one of the another routine and the called routine contains the breakpoint comprises accessing a call graph node of at least the another routine.

* * * * *

UNITED STATES PATENT AND TRADEMARK OFFICE
CERTIFICATE OF CORRECTION

PATENT NO. : 6,931,631 B2 Page 1 of 1
DATED : August 16, 2005
INVENTOR(S) : Cary Lee Bates and William Jon Schmidt It is certified that error appears in the above-identified patent and that said Letters Patent is hereby corrected as shown below:

<u>Title page,</u>
Item [75], Inventors, "Cary Lee Bates, Rochester, MO (US)" should be -- Cary Lee Bates, Rochester, MN (US) --; and "William Jon Schmidt, Rochester, MO (US)" should be -- William Jon Schmidt, Rochester, MN (US) --.

Signed and Sealed this

Twenty-first Day of March, 2006

JON W. DUDAS
*Director of the United States Patent and Trademark Office*